(12) United States Patent
King (10) Patent No.: US 11,022,291 B1
(45) Date of Patent: Jun. 1, 2021

(54) HIGH PRESSURE HYDRO-COOLED MISTING/VAPOR ILLUMINATION SYSTEM FOR LED DEVICES USING LIQUID OR GAS

(71) Applicant: Derek Kyle King, Williamsburg, VA (US)

(72) Inventor: Derek Kyle King, Williamsburg, VA (US)

( * ) Notice: Subject to any disclaimer, the term of this patent is extended or adjusted under 35 U.S.C. 154(b) by 531 days.

(21) Appl. No.: 15/732,525

(22) Filed: Nov. 22, 2017

Related U.S. Application Data (63) Continuation of application No. 29/620,862, filed on Jul. 26, 2017, now Pat. No. Des. 872,352.

(60) Provisional application No. 62/603,587, filed on Jun. 5, 2017.

(51) Int. Cl.
| | |
|---|---|
| F21V 29/57 | (2015.01) |
| A01G 9/24 | (2006.01) |
| H01J 61/52 | (2006.01) |
| F21V 25/12 | (2006.01) |
| F21V 29/89 | (2015.01) |
| A01G 7/04 | (2006.01) |
| A01G 9/20 | (2006.01) |
| A01G 9/26 | (2006.01) |
| A01G 33/00 | (2006.01) |
| F21Y 115/10 | (2016.01) |
| A62C 3/00 | (2006.01) |

(52) U.S. Cl.
CPC .............. *F21V 29/57* (2015.01); *A01G 7/045* (2013.01); *A01G 9/20* (2013.01); *A01G 9/246* (2013.01); *A01G 9/249* (2019.05); *A01G 9/26* (2013.01); *A01G 33/00* (2013.01); *F21V 25/12* (2013.01); *F21V 29/89* (2015.01); *H01J 61/52* (2013.01); *A62C 3/00* (2013.01); *F21Y 2115/10* (2016.08)

(58) Field of Classification Search
CPC .......... A01G 7/045; A01G 9/20; A01G 9/246; A01G 9/249; A01G 9/26; A01G 33/00; F21V 29/503; F21V 29/57; H01L 33/64; H01L 33/648; H01J 61/52
See application file for complete search history.

(56) References Cited

U.S. PATENT DOCUMENTS

| | | | | |
|---|---|---|---|---|
| 7,300,187 | B2 * | 11/2007 | Huang | F21V 29/02 362/373 |
| 10,524,433 | B2 * | 1/2020 | Spiro | A01G 9/126 |
| 2012/0002401 | A1 * | 1/2012 | Clifford | F21V 29/30 362/101 |
| 2013/0003382 | A1 * | 1/2013 | Ohura | A01G 9/26 362/253 |

(Continued)

*Primary Examiner* — Ryan A Reis (57) ABSTRACT

The utility model embodies a greenhouse hydro-cooled grow light LED system that administers a mist or vapor. This system operates in a range of temperatures, which are determined by the liquid temperature running through the channeled copper heatsink. The manipulation of the liquid's temperature produces the desired humidity. A brass high pressure liquid barbed valve fitting is secured on either side of the light housing, which is also connected to a humidity sensor electrical outlet. Low humidity closes the liquid valve. This allows a liquid pressure increase in all liquid lines, until the liquid release pressure of 60 psi is reached. The mist/vapor component is realized through the placement of high pressure mist nozzles. At release pressure, an atomized mist with droplets under 60 microns is outflowed.

1 Claim, 10 Drawing Sheets

(56) References Cited

U.S. PATENT DOCUMENTS

2016/0057944 A1\* 3/2016 Smits .................... F21V 29/763
                                                         362/373
2017/0146226 A1\* 5/2017 Storey ..................... F21V 29/56

\* cited by examiner

HIGH PRESSURE HYDRO-COOLED MISTING/VAPOR ILLUMINATION SYSTEM FOR LED DEVICES USING LIQUID OR GAS

FIELD OF THE INVENTION

The present invention relates to manipulating the lighting systems operating environment. In particular, this invention correlates to the placement of an interior component which has the capacity to change the internal operating temperature of the light. In addition, what makes the present invention unique is that it can also influence and manipulate the external encompassing atmospheric environment by using the elements onboard in concert with each other. Some of which is achieved with a misting or vapor valve.

BACKGROUND

This customized LED allows for the manipulation of the environment it resides in which you can adjust and control the environment simultaneously using the light source. This works due to the utilization of principles based on vapor pressure deficit science. VPR is the difference between the amount of moisture in the air and how much moisture the air can hold when it is saturated. This system auto adjusts to levels that corresponds to desired VPR levels for any given temperature fluctuation. The positive temperature coefficient 100 ohm thermistor is secured to the chip's copper base plate, regulates the power delivered to the light via a pulse width modulation signal line. This is preset to prevent a rise in temperature, outside of the optimum desired temperature zone. In conjunction, the addition of the high pressure atomizing system will fill in the other side of the equation. The VPD chart shows the perfect equilibrium set between the two of the custom LED chip.

When temperatures are at certain levels you need corresponding humidity levels to unlock superior photosynthesis absorption. This custom fabricated silicone LED chip, utilizing a light spectrum that is tailored to only emit wavelengths with the highest efficiency for plant growth. You have the ability to regulate your vpd levels completely through this lighting system.

Drawbacks from conventional LED light fixtures in an agricultural, scientific or biomass capacity, required additional equipment, such as air-conditioners and humidifiers. These were needed primarily to control satisfactory atmospheric conditions necessary for a successful outcome. This High Pressure Internal Hydro-Cooled Misting/Vapor System lessens much of that need for the added equipment outside of the proposed system.

Therefore, a need exists in the field for an LED light source that is capable of operating in a cool state, since that will extend the operating life of the light source. A further desired feature exists in that the internal cooling feature also has the ability to utilize mist or vapor, as an atmospheric contributor to desired humidification and temperature conditions. Liquids are vaporized by means of light and not heat making the LED efficient. Vapor activation is triggered by a psi threshold in the irrigated lines of the device. Below this threshold the atomization ceases and the irrigated flow into the device recirculates in the user preference operation setup by the consumer. This system can also be used more specifically in the application of liquid nutrients, chemicals and other liquids necessary in a controlled (scientific) environment directly influencing the environment for a specific desired outcome.

BRIEF SUMMARY OF THE INVENTION

During operation LED lights require the coolest temperatures for consistent maximum intensity and function. The present invention is comprised of a high pressure internal hydro-cooling misting/vapor utility. This system can affect the lights operating temperature by providing the ability to add moisture or a specific liquid substance while also providing humidity to a designated area below the light. The light's hydro-cooling function can be used to influence the atmospheric conditions of the area depending on the temperature of the liquid running through the fixture. This is preset by a water chiller attached to the reservoir of liquid that runs through the manifold for the light's irrigation. The high pressure misting/vapor process is regulated by a solenoid valve that cuts off the flow to the irrigated manifold which is connected to the light system. This creates the adequate back-pressure to activate the vapor mist nozzles. When humidity levels are achieved the humidity control outlet, the solenoid is plugged into, will release the pressure back into its recirculating flow state, until humidity is again required.

With a simple LED chip and valve change, diversifies the system to offer up an array of other functions. Between an algae bioreactor to a fire-extinguishing office/commercial lighting system, further highlighting the applications and abilities of this invention to extend beyond exclusivity to only agriculture.

BRIEF DESCRIPTION OF THE DRAWING

Some embodiments of the present invention are illustrated as an example and is not limited by the figures of the accompanying drawings, in which like references may indicate similar elements and in which.

DETAILED DESCRIPTION OF THE INVENTION

The terminology used herein is for the purpose of describing particular embodiments only and is not intended to be limiting of the invention. As used herein, the term "and/or" includes any and all combinations of one or more of the associated listed items. As used herein, the singular forms "a," "an," and "the" are intended to include the plural forms as well as the singular forms, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

Unless otherwise defined, all terms (including technical and scientific terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

In describing the invention, it will be understood that a number of techniques and steps are disclosed. Each of these has individual benefit and each can be used in conjunction with one or more, or in some cases all, of the other disclosed applications. For the sake of clarity, this description will refrain from repeating every possible combinations of the individual steps in an unnecessary fashion. Nevertheless, the specifications should be read with the understanding that such combinations are entirely within the scope of the invention.

The present disclosure is to be considered as an exemplification of the invention, and is not intended to limit the invention to the specific embodiments illustrated by the figures or description below.

The present invention will be described by referencing the appended figures.

Figure 1:
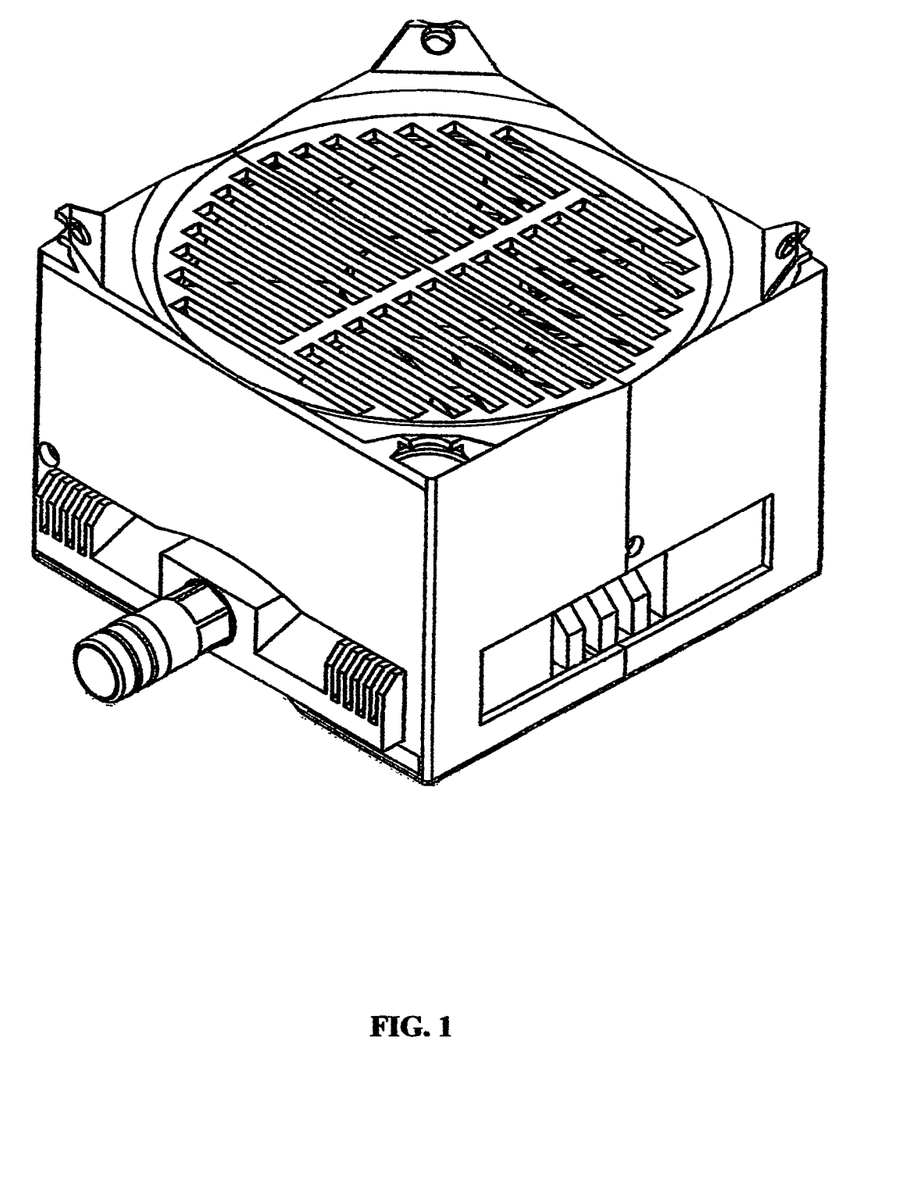
FIG. 1 depicts a perspective view of one example of the high pressure hydro-cooled misting/vapor LED device with embodiments of the present invention.
Figure 2:
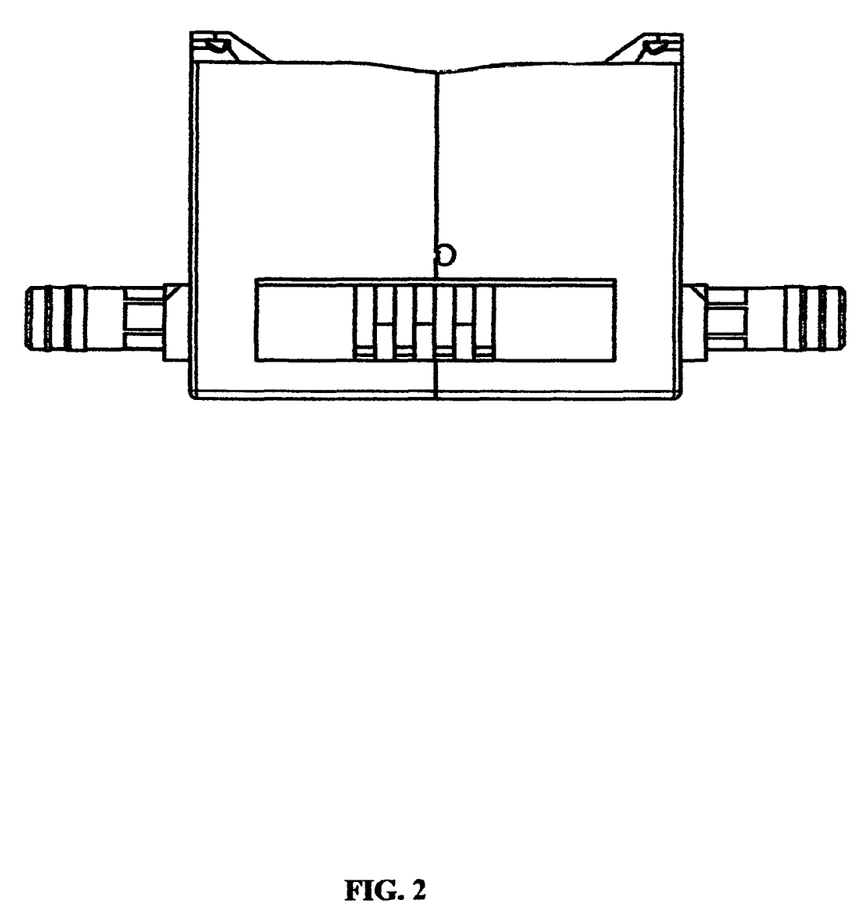
FIG. 2 depicts the front view of the high pressure hydro-cooled misting/vapor LED device.
Figure 3:
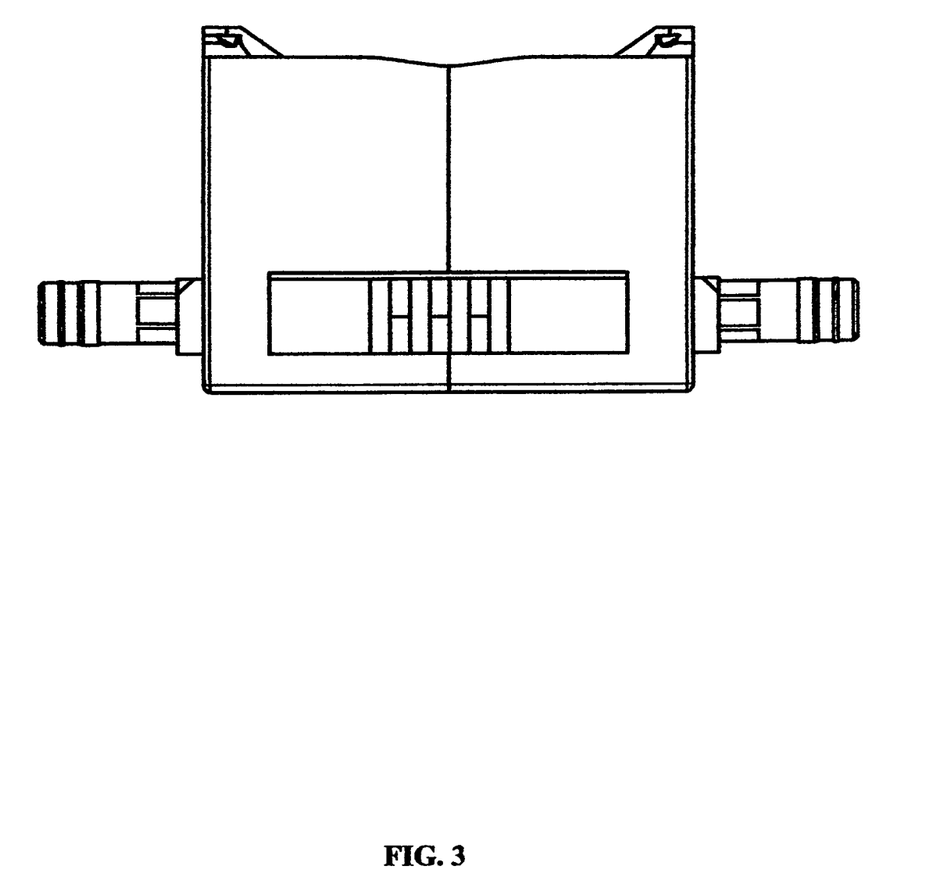
FIG. 3 depicts the back view of high pressure hydro-cooled misting/vapor LED device.
Figure 4:
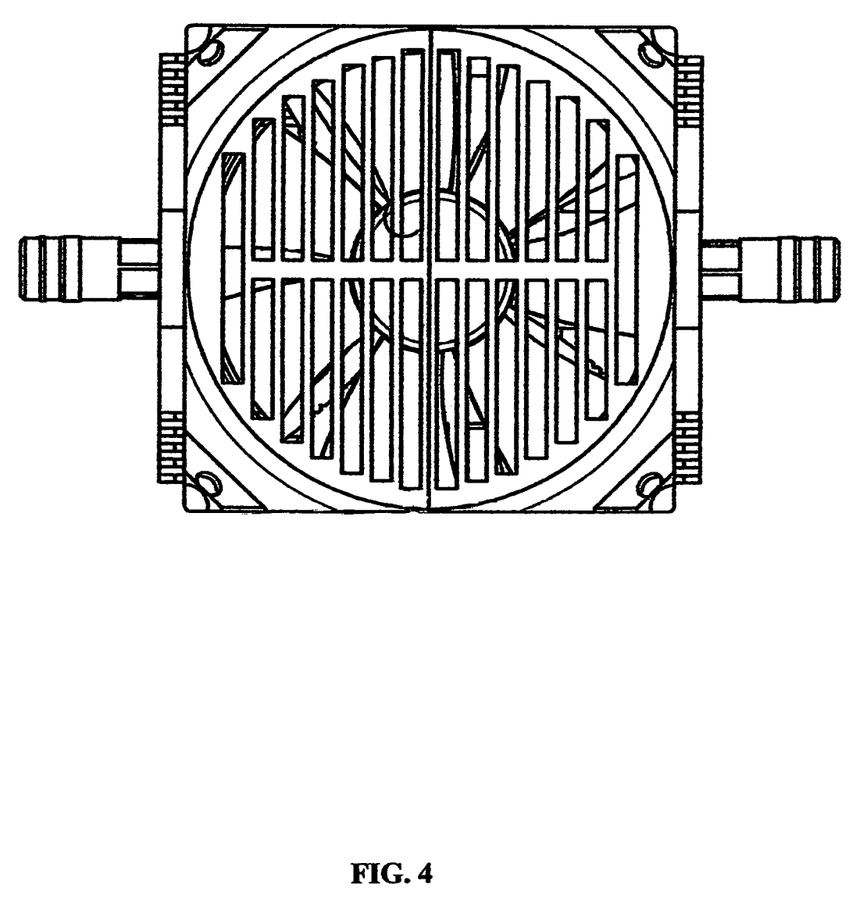
FIG. 4 depicts the top view of high pressure hydro-cooled misting/vapor LED device.
Figure 5:
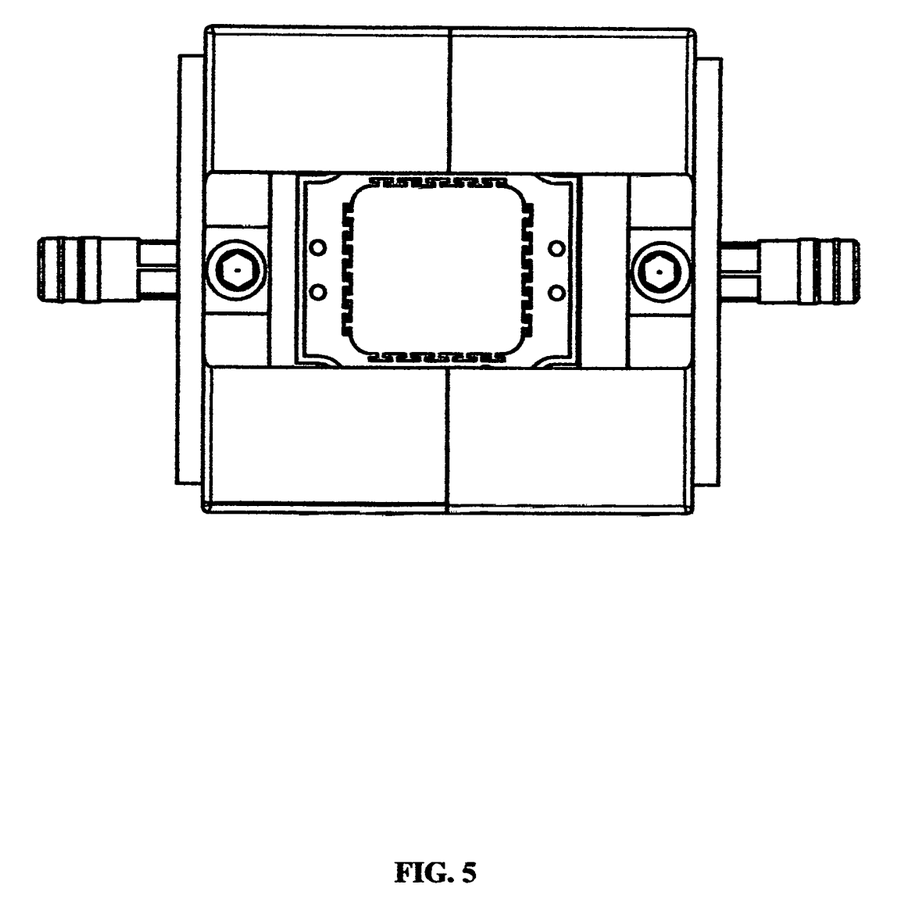
FIG. 5 depicts bottom view of high pressure hydro-cooled misting/vapor LED device.
Figure 6:
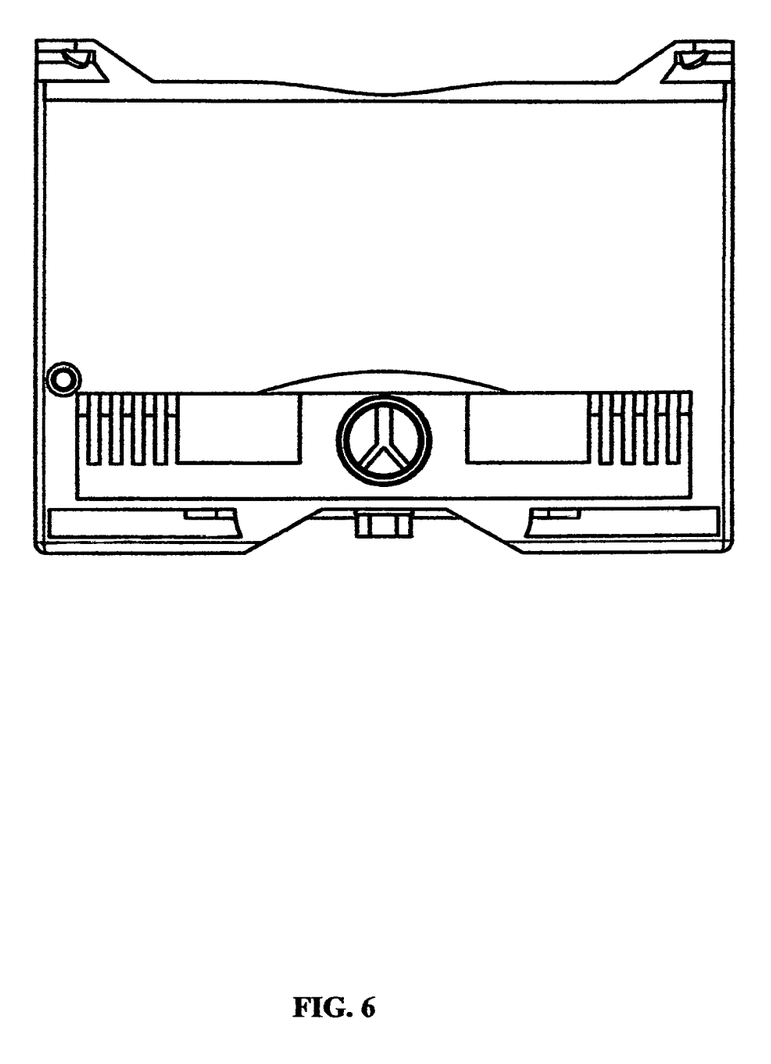
FIG. 6 depicts both the right and left view, being identical, of the high pressure hydro-cooled misting/vapor LED device.
Figure 7:
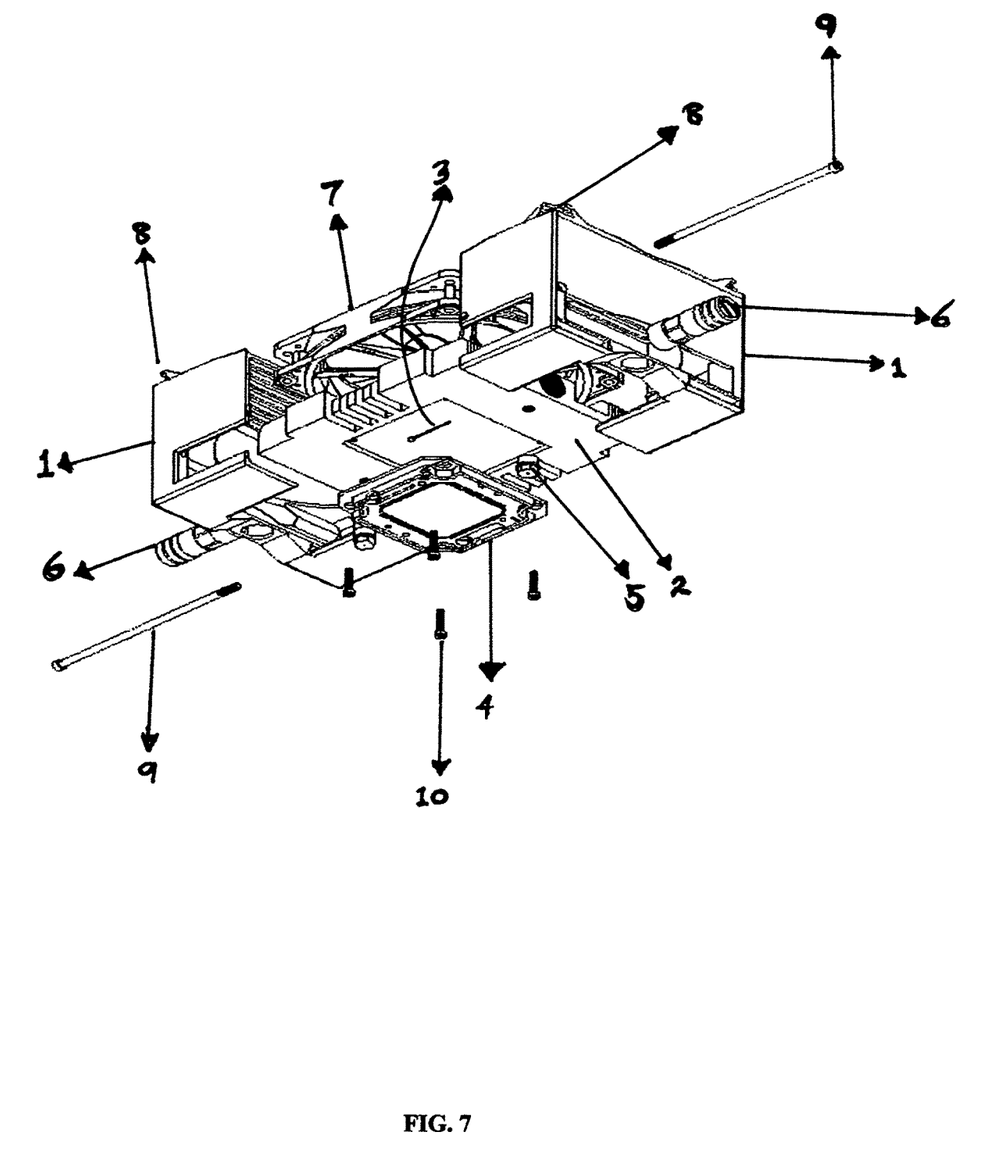
FIG. 7 illustrates an exploded view of the high pressure hydro-cooling misting/vapor LED device with elements and placement according to various embodiments hydro-cooled mist/vapor LED device

FIG. 1 depicts a perspective view of the elements.
FIG. 2 is the front view of same invention.
FIG. 3 is the back view of same invention.
FIG. 4 is the top view of same invention.
FIG. 5 is the bottom view of same invention.
FIG. 6 is the (left and right) side view of same invention.
FIG. 7 is the exploded view of the high pressure hydro-cooled mist/vapor light system. The majority of the assembly is based on the precise measurements of the aluminum lamp body which enables it to cocoon (hugs) the internal elements, 120 mm inline high velocity fan and thermistor which is placed between LED chip and is then secured with 4 m3 screws to the copper heatsink with liquid core channel.

a. Element 1, in both figures, is the half piece (2.5 mm) aluminum lamp body shell with element 8 built in fan guard and wire restraining bushing.
b. Element 7 120 mm waterproof ip68 rating inline fan to promote additional cooling to the systems operating components. This fan's durability can endure dust, water, high heat and high humidity.
c. Element 2 copper heat sink component with liquid core channel. Element 5 brass high pressure mist nozzle.
d. Element 4 high powered silicone covered LED chip, pure copper c11000 base plate with Element 3 embedded Positive Temperature Coefficient (PCT) 100 k ohm thermistor. The power is regulated by the thermistor which sends the appropriate amount power to the light according to the temperature of the environment the light is operating in to ensure proper intensity.
e. Element 6 two ⅜" threaded NPT ⅝" brass high pressure liquid barbed fitting to attach ⅝" water line. This is also the connection point where another unit can be attached, turning the single device into a multiple unit system.
f. Element 9 two titanium bolts 118 ml length, m4×0.7 join the two sides of the device housing adding reinforcement.
g. Element 10 four m3 screws which secures the LED to heatsink. Nestling the thermistor between the two.
h. Element 11 four 14 gauge copper wires which connect to power source. Two connect to the heatsink and two to the fan.

Figure 8:
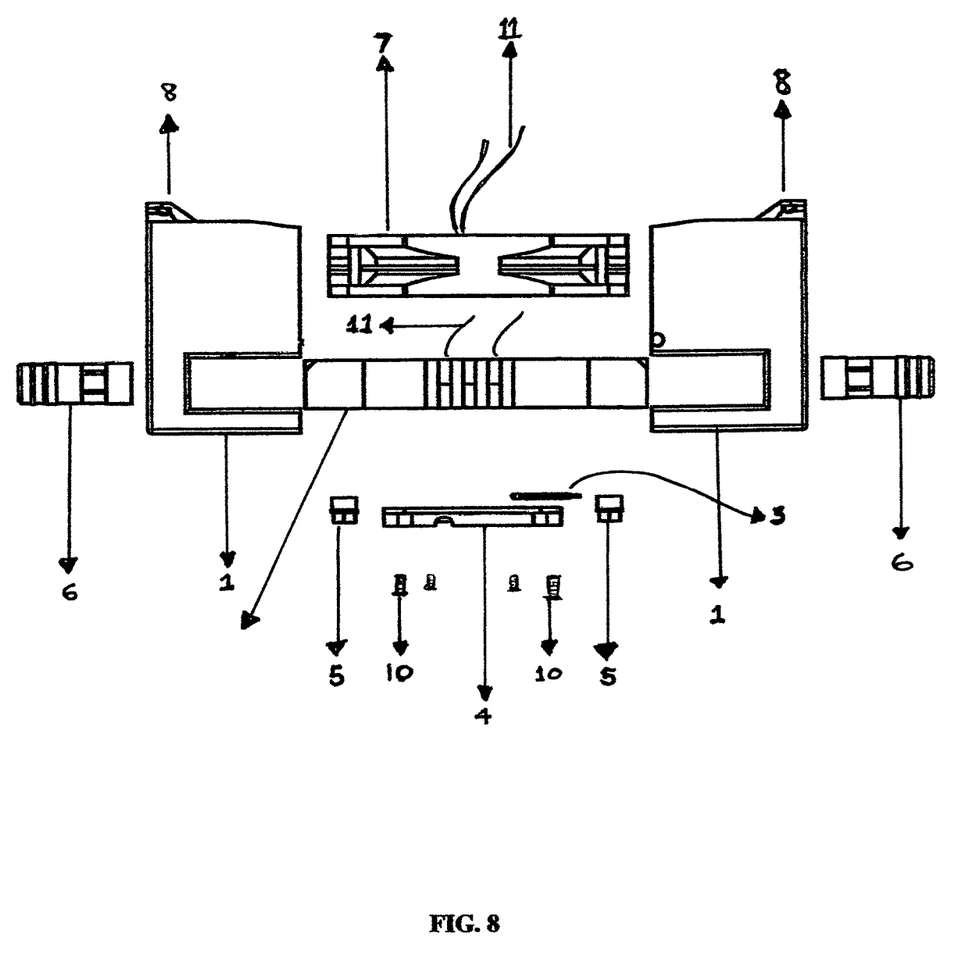
Figure 9:
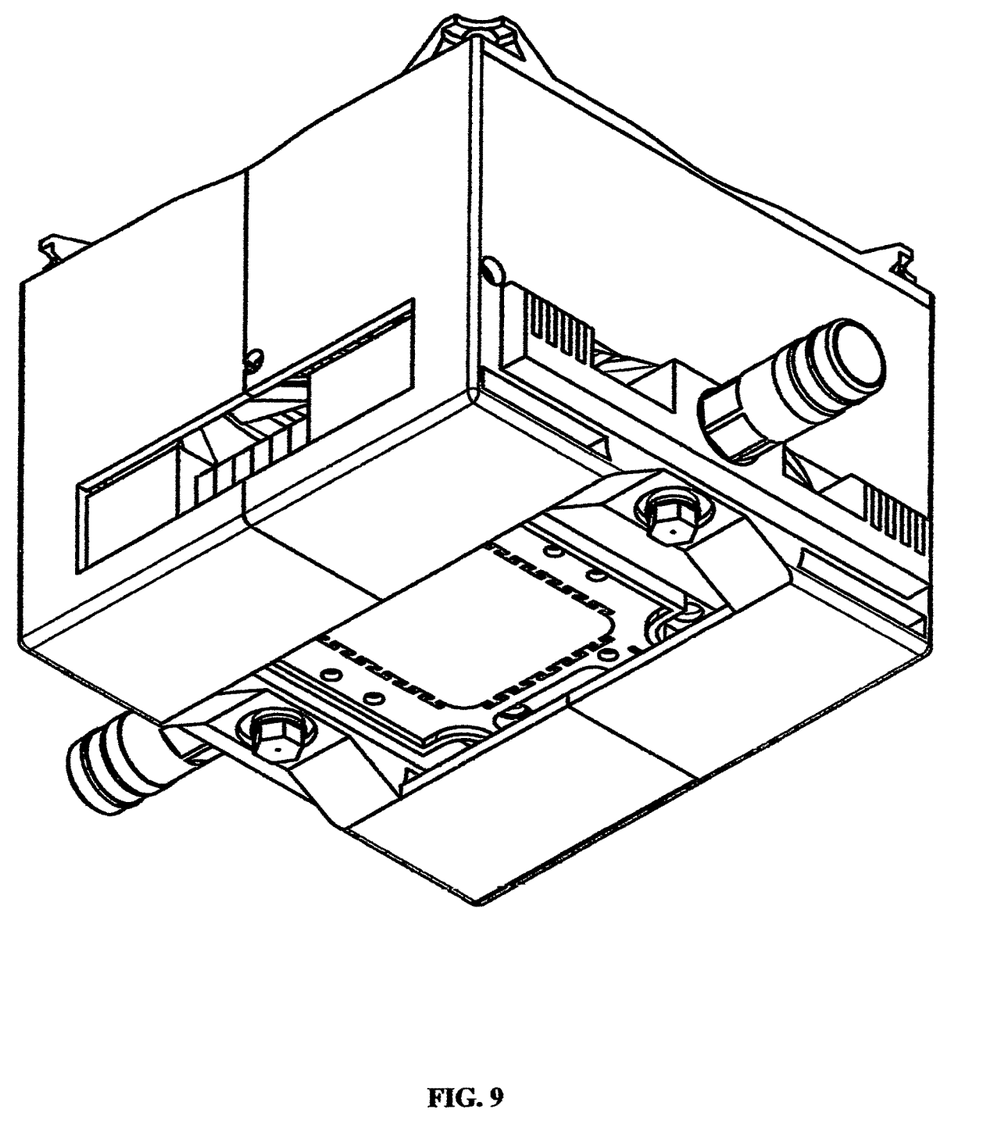
FIG. 9 depicts the enlarged view of assembled high pressure hydro-cooled misting/vapor LED device illustrating an enhanced indication of the misting/vapor feature.
Figure 10:
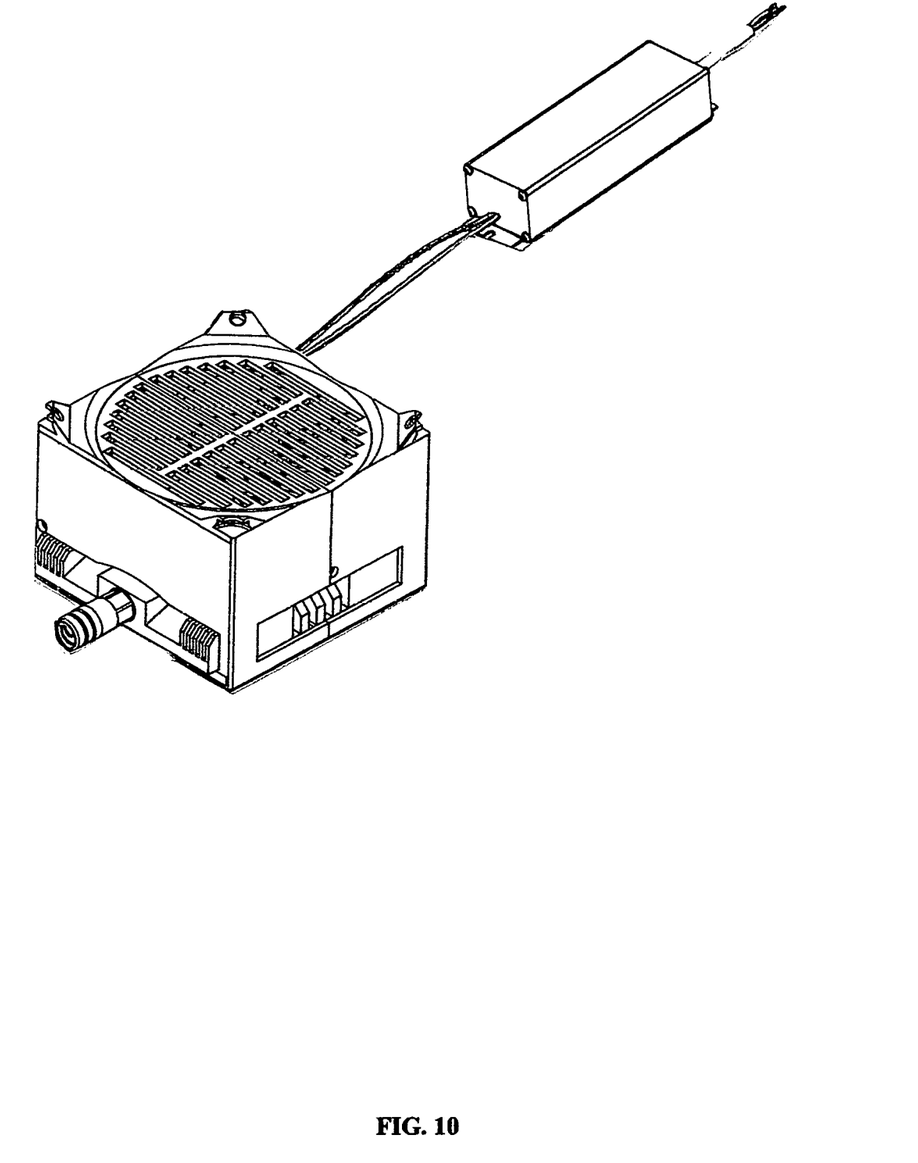
FIG. 10 illustrates the operational layout of the high pressure hydro-cooled misting/vapor LED device.

FIG. 8 is the cross sectioned view of same invention.
FIG. 9 is the enlarged view of same invention emphasizing position and location of misting/vapor valves in relation to chip placement.
FIG. 10 is the operational view showing only one unit and depicts placement of power supply. In multi unit systems, there are multiple devices that are joined at either one or both sides as stated in element 6 of same invention.

While preferred materials for elements have been described, the device is not limited by these materials. Other materials may comprise some or all of the elements of the present invention.

Although the present invention has been described and illustrated herein with reference to preferred embodiments and specific example thereof, it will be readily apparent to those of ordinary skill in the art that other embodiments and examples may perform similar functions and/or achieve like results. All such equivalent embodiments and examples are within the spirit and scope of the present invention.

I claim:

1. An atomizing LED lighting device with a high pressure internal liquid process, comprising:
   an LED light;
   an irrigation line which carries fluid to cool the LED light;
   at least one vapor mist nozzle connected to the irrigation line;
   and a solenoid valve regulating fluid flow in the irrigation line; wherein,
   the at least one vapor mist nozzle is activated when the fluid pressure in the irrigation line is above a threshold, and wherein the at least one vapor mist nozzle is deactivated when the fluid pressure in the irrigation line is below the threshold, causing the fluid in the irrigation line to recirculate.

* * * * *